United States Patent [19]

Tam

[11] 3,748,500
[45] July 24, 1973

[54] MULTIPLE REDUNDANT POWER SUPPLY

[76] Inventor: Ford Tam, 810 Chestnut St., Birmingham, Mich. 48008

[22] Filed: Dec. 22, 1971

[21] Appl. No.: 210,720

[52] U.S. Cl............... 307/297, 128/419 P, 307/65, 307/69, 307/71, 307/202, 307/219
[51] Int. Cl............................ H03k 1/12, H02j 9/04
[58] Field of Search.................. 128/419 P; 307/60, 307/61, 63, 64, 65, 69, 71, 77, 201, 202, 242, 243, 296, 297; 320/7, 13, 15, 16, 17, 18

[56] References Cited
UNITED STATES PATENTS

| | | | |
|---|---|---|---|
| 3,459,957 | 8/1969 | Kelley | 307/71 |
| 3,207,966 | 9/1965 | Parkinson | 307/71 X |
| 3,221,239 | 11/1965 | Langer et al. | 307/63 X |
| 3,384,758 | 5/1968 | Kelley | 307/77 |
| 3,387,194 | 6/1968 | Banks | 320/7 X |
| 3,411,014 | 11/1968 | Kupperberg | 307/61 X |
| 3,480,789 | 11/1969 | Binckley et al. | 307/69 X |
| 3,487,229 | 12/1969 | Krausz | 307/71 |
| 3,496,450 | 2/1970 | Thiele | 320/17 X |
| 3,620,220 | 11/1971 | Murphy, Jr. | 307/66 X |
| 3,666,961 | 5/1972 | Bogue et al. | 307/65 |

FOREIGN PATENTS OR APPLICATIONS

| | | | |
|---|---|---|---|
| 197,239 | 7/1965 | Sweden | 307/71 |
| 119,147 | 11/1944 | Australia | 320/18 |

Primary Examiner—John W. Huckert
Assistant Examiner—L. N. Anagnos
Attorney—Louis E. Marn, Marvin S. Gittes et al.

[57] ABSTRACT

A multiple redundant power supply for supplying a substantially constant voltage to output terminals is disclosed in accordance with the teachings of the present invention. A first pair of voltage sources is coupled to one output terminal and a second pair of voltage sources is coupled to another output terminal and connected in series with the first pair of voltage sources. Steering diodes are provided such that a series connection obtains between either one of the voltage sources included in the first pair and either one of the voltage sources included in the second pair. First switch means interconnects the voltage sources included in the first pair and is adapted when activated to provide a series connection between the first pair voltage sources. Second switch means interconnects the voltage sources included in the second pair and is adapted when activated to provide a series connection between the second pair of voltage sources. The first or second switch means are activated by voltage detecting means coupled to the output terminals upon detection of a failure of the second pair or first pair of voltage sources, respectively.

8 Claims, 1 Drawing Figure

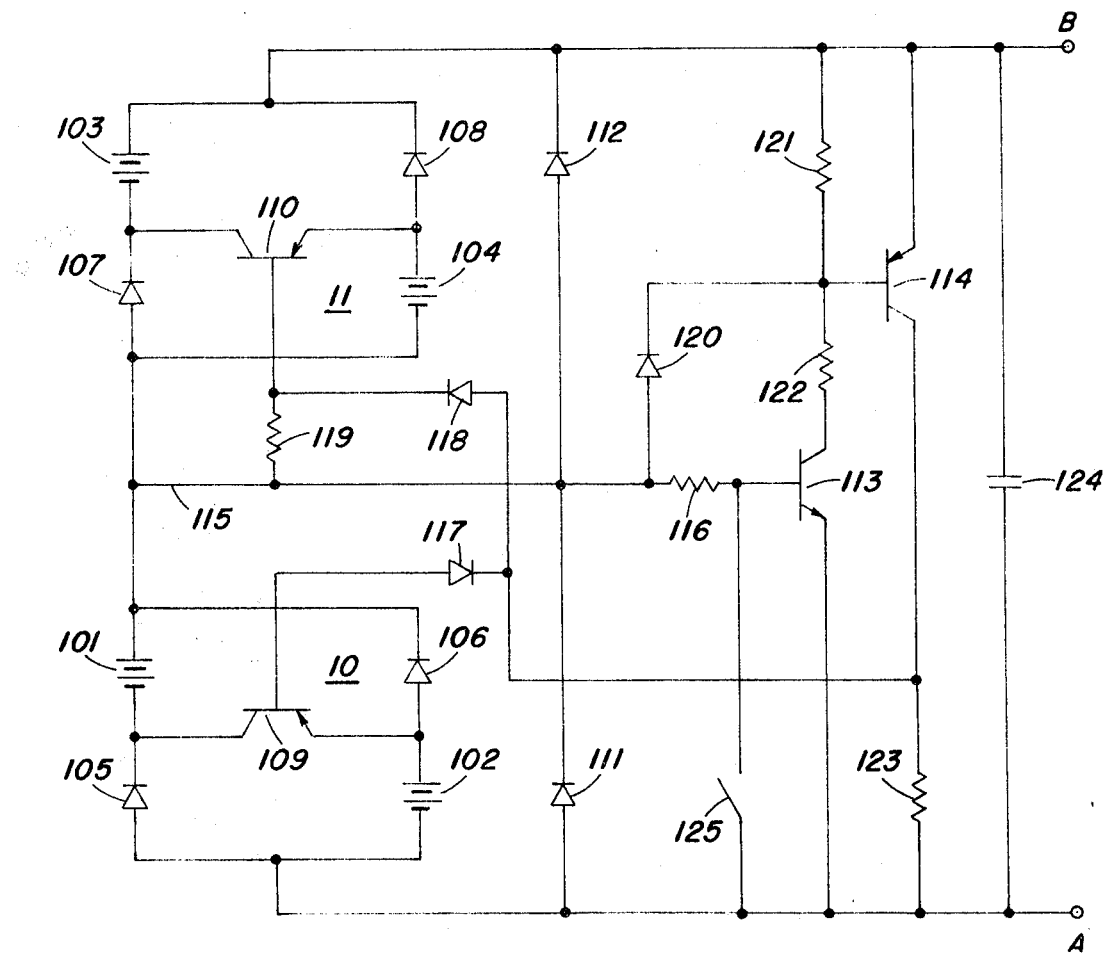

MULTIPLE REDUNDANT POWER SUPPLY

This invention relates to power supplies and, more particularly, to a multiple redundant power supply capable of supplying a substantially constant voltage notwithstanding a failure of one or more voltage sources included therein.

Various electrical devices that derive energy from a d.c. power supply require that the voltage supplied by the power supply maintain a substantially constant value over prolonged periods of time. These diverse devices encompass electronic circuits and systems utilized in space exploration as well as surgically implanted devices adapted to regulate organic functions. A typical example of the latter is the "Pacemaker" which provides for electrical stimulation and regulation of the heart. It is, of course, obvious that proper operation of the "Pacemaker" electronics is dependent upon a substantially constant voltage supplied thereto by the implanted power supply. Furthermore, to obviate the necessity of frequent replacements by surgical procedures, it is essential that the voltage sources included in the "Pacemaker" power supply admit of excellent longevity characteristics. Accordingly, it is preferable to employ mercury cells as the voltage source for the "Pacemaker" and various other electronic devices wherein high reliability and longevity of the power supply are fundamental factors.

Although power supplies including mercury cells exhibit characteristics that are generally well suited for electronic devices such as those described hereinabove wherein frequent replacement of a voltage source is either impossible or undesirable, the possibility of premature failure of a mercury cell must be considered. The prior art has suggested a redundant power supply comprised of two mercury cells and including a voltage multiplier to provide the necessary voltage for energizing the electronic device. Further proposals have contemplated the use of a redundant power supply employing mercury cells arranged in permutative series combination. An attendant disadvantage of these prior art suggestions resides in the fact that although a substantially constant voltage is provided in the event of a failure of a single voltage source, there is no protection against the deleterious effects occasioned by the failure of two voltage sources. Moreover, in power supplies that are surgically implanted, such as those that find ready application with the "Pacemaker", there has heretofore been no contemplation of a simple and reliable technique to facilely examine the operability of the voltage sources included therein.

Therefore, it is an object of the present invention to provide a multiple redundant power supply for supplying a substantially constant voltage notwithstanding a failure of one or more of the voltage sources included in the power supply.

It is another object of the present invention to provide a multiple redundant power supply including externally operable means for examining the operating characteristics of the voltage sources included in the power supply.

A further object of this invention is to provide a power supply admitting of high reliability and longevity and adapted for surgical implantation in an organism.

Yet another object of the present invention is to provide a surgically implantable power supply wherein investigation of the operativeness thereof does not require removal from an organism.

An additional object of this invention is to provide a multiple redundant power supply capable of supplying a substantially constant voltage when all but any two of the voltage sources therein have failed.

A still further object of this invention is to provide a multiple redundant power supply including means for rearranging the circuit connections of the voltage sources included therein upon detecting the failure of two of such voltage sources.

Various other objects and advantages of the invention will become clear from the following detailed description of an exemplary embodiment thereof and the novel features will be particularly pointed out in connection with the appended claims.

In accordance with this invention, a multiple redundant power supply is provided wherein a substantially constant voltage is supplied to output terminals notwithstanding a failure of one or more voltage sources included in said power supply, and comprising a first pair of parallel coupled voltage sources coupled to one output terminal; a second pair of parallel coupled voltage sources coupled to another output terminal and connected in series with said first pair of parallel coupled voltage sources; said first and second pairs of voltage sources being provided with steering diodes to permutatively establish series connections between any one voltage source in said first pair and any one voltage source in said second pair; a first switch means interconnecting the parallel coupled voltage sources included in said first pair and adpated when activated to provide a series connection between said first pair of parallel coupled voltage sources; a second switch means interconnecting the parallel coupled voltage sources included in said second pair and adapted when activated to provide a series conection between said second pair of parallel coupled voltage sources; and voltage detecting means coupled to said output terminals for detecting a failure of the first pair of voltage sources or the second pair of voltage sources and responsive to said detected failure for activating said second switch means or said first switch means, respectively.

The invention will be more clearly understood by reference to the following detailed description of an exemplary embodiment thereof in conjunction with the accompanying drawing which schematically illustrates a multiple redundant power supply in accordance with the present invention.

Referring now to the drawing there is schematically illustrated a first pair of voltage sources 10 comprised of a first volage source 101, a second voltage source 102 and steering diodes 105 and 106, a second pair of voltage sources 11 comprised of third voltage source 103, fourth voltage source 104 and steering diodes 107 and 108. Each of voltage sources 101-104 may comprise any suitable d.c. source such as a conventional battery, a mercury cell or the like. The steering diodes 105-108 may comprise conventional semi-conductor unidirectional current conducting devices such as germanium diodes, silicon diodes or suitably biased transistors. It may be observed that the combination of voltage source 101 and diode 105 is parallel connected to the combination of voltage source 102 and diode 106. Similarly, the combination of voltage source 103 and diode 107 is parallel connected to the combination of voltage source 104 and diode 108.

The first and second pairs of voltage sources 10 and 11 are connected in series relationship between output terminals A and B. More particularly, it may be readily observed that four distinct series paths extend between output terminals A and B. Thus, a first series path is comprised of the series connection of output terminal A, steering diode 105, first voltage source 101, steering diode 107, third voltage source 103 and output terminal B. A second series path extends from output terminal A through steering diode 105, through first voltage source 101, through fourth voltage source 104, through steering diode 108 to output terminal B. A third series path extends from output terminal A through second voltage source 102, through steering diode 106, through steering diode 107, through third voltage source 103 to output terminal B. And a fourth series connection is comprised of output terminal A, second voltage source 102, steering diode 106, fourth voltage source 104, steering diode 108 and output terminal B. It should be noted that steering diodes 105–108 preclude any circulating currents from flowing between the parallel coupled voltage sources included in each pair of voltage sources. Thus, if a voltage source 101 fails so as to provide a short circuit, steering diode 105 is poled such that current cannot flow from voltage source 102, through steering diode 106, through short-circuited voltage source 101 and through steering diode 105. It is apparent that the remaining steering diodes 106–108 are poled in an analogous manner to prevent the flow of current through a short-circuited voltage source in the event of failure.

If it is assumed that the voltage supplied by each voltage source 101–104 is equal to E then the illustrated configuration of series connected pairs 10 and 11 provides a substantially constant voltage 2E across output terminals A and B, even in the event of a failure of any single voltage source. Thus, if voltage source 101 fails, an output voltage equal to 2E will be provided from output terminal A, through voltage source 102 through steering diode 106, through steering diode 107, through voltage source 103 to output terminal B. An alternative path results in an output voltage equal to 2E from output terminal A, through voltage source 102, through steering diode 106, through voltage source 104, through steering diode 108 to output terminal B. Similarly, should voltage source 102 fail, an output voltage 2E is provided from output terminal A through steering diode 105 through voltage source 101 and then, alternatively, through steering diode 107 and voltage source 103 or through voltage source 104 and steering diode 108, to output terminal B. Now, should voltage source 103 fail, an output voltage 2E is provided from output terminal A, through steering diode 105 through voltage source 101, through voltage source 104, through steering diode 108 to output terminal B. Alternatively, the output voltage 2E is derived from output terminal A through voltage source 102, through steering diode 106, through voltage source 104, through steering diode 108 to output terminal B. Finally, if voltage source 104 fails, the output voltage 2E may be derived from the alternate paths consisting of output terminal A, steering diode 105 and voltage source 101, or voltage source 102 and steering diode 106, and then through steering diode 107 and voltage source 103 to output terminal B.

It should now be appreciated that the series connection of pairs of voltage sources 10 and 11 as illustrated herein provide a substantially constant voltage 2E in the event of a failure of one of the voltage sources 101–104. The illustrated configuration further provides a substantially constant output voltage 2E in the event of a failure of one voltage source in each pair of voltage sources. Thus, if voltage sources 101 and 103 fail to operate, an output voltage 2E is provided from output terminal A, through voltage source 102, through steering diode 106, through voltage source 104, through steering diode 108 to output terminal B. It is noted that steering diodes 105 and 107 are disposed to prevent a short-circuiting of the output terminals A and B if voltage sources 101 and 103 exhibit a short-circuiting failure. Similarly, if voltage sources 101 and 104 fail, the output voltage 2E is provided from output termina A, through voltage source 102, through steering diode 106, through steering diode 107, through voltage source 103 to output terminal B. Steering diodes 105 and 108 are here provided to prevent the short-circuiting of output terminals A and B. Likewise, if voltage sources 102 and 103 should fail, the output voltage 2E is provided from output terminal A, through steering diode 105 through voltage source 101, through voltage source 104, through steering diode 108 to output terminal B. Short circuiting of the output terminals A and B is prevented by steering diodes 106 and 107. Finally, in the event of failure of voltage sources 102 and 104, the output voltage 2E is derived from output terminal A, through steering diode 105, through voltage source 101, through steering diode 107, through voltage source 103 to output terminal B; and short circuiting of the output terminals is prevented by steering diodes 105 and 107.

It is a feature of the present invention to provide the output voltage 2E across terminals A and B in the event of a failure of the first pair of voltage source 10 or the second pair of voltage sources 11. More particularly, should voltage sources 101 and 102 both fail, then means are provided to connect voltage sources 103 and 104 in series aiding relationship across output terminals A and B. Similarly, should both voltage sources 103 and 104 fail, then means are provided to connect voltage sources 101 and 102 in series aiding relationship across output terminals A and B. In accordance with the instant invention, switch means 109 interconnects the negative terminal of voltage source 101 and the positive terminal of voltage source 102. Switch means 109 is here illustrated as a saturable transistor means adapted when activated to provide a series connection between voltage sources 101 and 102. Alternatively, switch means 109 may comprise other conventional switching devices such as a relay or the like. The control electrode of switch means 109, i.e., the base electrode of the transistor means or the energizing coil of the relay means, is coupled through diode 117 to a voltage detecting means further described hereinbelow. Similarly, switch means 110 interconnects the negative terminal of voltage source 103 and the positive terminal of voltage source 104. The switch means 110 is similar to switch means 109 and is coupled via diode 118 to the soon to be described voltage detecting means.

The aforementioned voltage detecting means is comprised of complementary transistor means 113 and 114 coupled across output terminals A and B. Transistor means 113 is supplied with a bias potential whereby the transistor means normally assumes a saturating condition in the absence of a failure of the first pair 10 or the second pair 11 of voltage sources. Accordingly, transistor means 113 includes a base electrode coupled to line 115 through current limiting resistance means 116. It is recognized that line 115 is coupled to the junction formed by the series connection of the first and second pairs 10 and 11 of voltage sources and, therefore, is normally provided with a bias potential equal to one-half the output voltage 2E. Transistor means 113 includes an emitter electrode connected to output terminal A and a collector electrode connected via series connected resistance means 121 and 122 to output terminal B. The common connection of resistance means 121 and 122 is connected to the base electrode of transistor means 114. The emitter electrode of transistor means 114 is connected to output terminal B and the collector electrode of transistor means 114 is connected to output terminal A via resistance means 123. The collector electrode of electrode means 114 is additionally connected in common relationship to the cathode of diode 117 and the anode of diode 118. A further diode 120 is additionally provided between the base electrode of transistor means 114 and line 115 for a purpose soon to be described. A d.c. isolating capacitor 124 is provided across output terminals A and B. In addition, series connected diodes 111 and 112 are connected across output terminals A and B.

In operation, when neither the first pair of voltage sources 10 nor the second pair of voltage sources 11 has failed, output terminals A and B are provided with an output voltage 2E and line 115 receives a voltage E. The base-emitter voltage drop across transistor means 113 is therefore sufficient to drive the transistor means into saturation. Accordingly, current flows from terminal B through series connected resistance means 121 and 122 through transistor means 113 to output terminal A. The series connected resistance means 121 and 122 form a voltage dividing circuit whereby the voltage applied to the base electrode of transistor means 114 is less than the voltage 2E applied to the emitter electrode thereof. Resistance means 121 and 122 may be selected to provide any suitable base voltage to transistor means 114. Accordingly, transistor means 114 is similarly driven into saturation whereby the voltage present at the collector electrode thereof is equal to the output voltage 2E applied to the emitter electrode thereof. It should be recognized that this effect may be obtained if resistance means 122 were provided in the emitter circuit of the saturated transistor means 113 and the base electrode of transistor means 114 were connected to the collector electrode of transistor means 113. The voltage 2E is applied by diode 118 from the collector electrode of transistor means 114 to switch means 110. If, for purposes of explanation, it is assumed that switch means 110 comprises a transistor means it is observed that the voltage applied to the emitter electrode thereof is substantially equal to the voltage applied to the base electrode thereof. Consequently, transistor means 110 is maintained in its cutoff state. Similarly, if switch means 109 is assumed to comprise a transistor means, then diode 117 is effective to reversibly bias transistor means 109 such that the transistor means maintains its cutoff state. Consequently, series connections are not established between voltage sources 101 and 102 or between voltage sources 103 and 104.

Let it now be assumed that the first pair of voltage sources 10 fail. Thus, voltage sources 101 and 102 may each be open- or short-circuited. The voltage provided at line 115 is thus reduced to zero and transistor means 113 is driven out of saturation to assume its cutoff state. Accordingly, current ceases to flow through the collector circuit of transistor means 113 and the voltage applied to the base electrode of transistor means 114 is substantially equal to the voltage applied to the emitter electrode thereof. Hence, transistor means 114 is driven out of its saturation state and assumes its cutoff state. It is therefore appreciated that the voltage applied from the collector electrode of transistor means 114 to the base electrode of transistor means 110, which voltage is substantially equal to zero, is sufficiently less than the voltage applied to the emitter electrode of transistor means 110 whereby a current circulating path is established from the positive terminal of voltage source 104, through the emitter-base junction of transistor means 110, through current limiting resistance means 119, to line 115, to the negative terminal of voltage source 104. Hence, transistor means 110 is driven into saturation and a short-circuit series connection is established between the negative terminal of voltage source 103 and the positive terminal of voltage source 104. Consequently, an output voltage 2E is derived from output termianl A, through diode 111, through line 115, through voltage source 104, through the emitter-collector junction of saturated transistor means 110, through the voltage source 103 to output terminal B. Steering diodes 107 and 108 are suitably poled to prevent currents from circulating from the positive terminal of voltage source 104, through the emitter-collector junction of transistor means 110, to the negative terminal of voltage source 104 and, similarly, to prevent currents from circulating from the positive terminal of voltage source 103, through the emitter-collector junction of transistor means 110, to the negative terminal of voltage source 103.

Let it now be assumed that the pair of voltage sources 11 fails. The voltage momentarily applied across terminals A and B, as well as the voltage applied to line 115, is reduced to E. The base-emitter bias potential of transistor means 113 is thus sufficient to maintain the transistor means in saturation. Accordingly, the voltage division effected by resistance means 121 and 122 would appear to provide a voltage less than E to the base electrode of transistor means 114 whereas the emitter electrode of transistor means 114 maintains a voltage E. However, diode 120 is poled so as to supply the voltage provided at line 115, which voltage is greater than the voltage division effected by resistance means 121 and 122, to the base electrode of transistor means 114. Consequently, the voltages applied to the base and emitter electrodes of transistor means 114 are substantially equal so as to drive the transistor means into its cutoff state. Consequently, the voltage appearing at the collector electrode of transistor means 114 is substantially equal to zero. Transistor means 109 is thus suitably biased to permit current to now flow from the positive terminal of voltage source 102, through the emitter-base junction of transistor means 109, through diode 117, through resistance means 123 to the negative terminal of voltage source 102. Consequently, transistor means 109 is driven into saturation and a series connection is established between the negative terminal of voltage source 101 and the positive terminal of voltage source 102. An output voltage of 2E is now derived from output terminal A, through voltage source 102, through saturated transistor means 109, through voltage source 101, through line 115, through diode 112 to output terminal B. It may be observed that steering diodes 105 and 106 are suitably poled in a manner previously described with respect to steering diodes 107 and 108 such that circulating currents are prevented from flowing in the two loops now established in the first pair of voltage sources 10.

It should now be readily appreciated that transistor means 113 included in the voltage detecting circuit functions as a control transistor to determine the state assumed by transistor means 114 in response to a detected failure of one pair of voltage sources. Furthermore, diode 120 may comprise a suitable unidirectional current conducting device, including a biased transistor, to maintain the transistor means 114 in its cutoff state upon detecting a failure of the pair of voltage sources 11. It is recognized by those of ordinary skill in the art that this maintains transistor means 114 in its cutoff state when the pair of voltage sources 11 should fail. Furthermore, diodes 111 and 112 may comprise conventional uni-directional current conducting devices such as aforedescribed steering diodes 105–108.

In view of the foregoing description of the invention schematically illustrated herein, it should now be readily apparent that the instant invention admits of desirable characteristics wherein the multiple redundant power supply may be surgically implanted in an organism and employed with such devices as the "Pacemaker." A distinct feature of the present invention resides in the adaptability thereof to an examination of the operativeness of the voltage sources 101–104 without the necessity of surgically removing the power supply. Accordingly, a magnetically sensitive reed switch 125 is connected in parallel relationship with the base-emitter junction of transistor means 113. It is appreciated that switch 125 is operable in response to a magnetic field that may be generated in the vicinity thereof by a proximately disposed magnetic source such as a permanent magnet, an electro-magnet or the like. Thus, switch 125 may be closed by the appropriate positioning by an operator of a suitable magnet. The closure of switch 125 is effective to maintain the base electrode and the emitter electrode of transistor means 113 at a common potential. Accordingly, transistor means 113 is driven from its saturation state to its cutoff state. It is recalled that when transistor means 113 assumes its cutoff state, transistor means 114 is driven out of saturation to likewise assume its cutoff state. Thus, diode 117 applies an essentially zero voltage to the base electrode of transistor means 109, whereas the emitter electrode thereof is maintained at a voltage equal to E. Similarly, the reduction in voltage applied to diode 118 by the collector electrode of transistor means 114 is effective to enable the voltage E appearing at line 115 to be applied to the base electrode of transistor means 110 via current limiting resistance means 119, whereas the voltage applied to the emitter electrode of transistor means 110 by voltage source 104 is substantially equal to 2E. Consequently, transistor means 109 and 110 assume their respective saturation states resulting in the series connections between voltage source 101 and voltage source 102 and between voltage source 103 and voltage source 104, respectively. It may therefore be observed that a current conducting path exists between output terminal A, through voltage source 102, through the emitter-collector junction of saturated transistor means 109, through voltage source 101 through voltage source 104, through the emitter-collector junction of saturated transistor means 110, through voltage source 103 to output terminal B. It is appreciated that when transistor means 109 and 110 assume their respective saturation states, the impedance exhibited thereby is sufficiently small such that the respective steering diodes 105–108 are effectively by-passed. Hence, only minimal current flows through the steering diodes.

The operativeness of voltage sources 101–104 may now be examined merely by detecting the voltage between output terminals A and B. If it is assumed that the voltage produced by each of the voltage sources is equal to E, then an output voltage 4E is indicative of the proper operating condition of each voltage source, an output voltage of 3E is indicative of the failure of one voltage source and an output voltage of 2E is indicative of the failure of two voltage sources. Hence, the output voltage applied to output terminals A and B is a direct representation of the operability of the voltage sources 101–104. Alternatively, the electronics of the "Pacemaker" that may be utilized with the power supply of the instant invention may be particularly designed to exhibit voltage responsive characteristics that provide a ready indication of the operating condition of the voltage sources 101–104. Accordingly, the frequency of the signal produced by the "Pacemaker" may be proportional to the voltage applied to output terminals A and B whereby a maximum frequency is produced when the voltage produced by the series connected voltage sources 101–104 is a maximum and said frequency decreases as the voltage produced by the series connected voltage sources decreases. Alternatively, the signal produced by the "Pacemaker" may exhibit a pulse width that is linearly proportional to the voltage produced by the series connected voltage sources 101–104. Furthermore, the signal produced by the "Pacemaker" may be a pulse having an amplitude that is proportional to the voltage produced by the series connected voltage sources. It is understood that the operation of the "Pacemaker" in response to the voltage applied to output terminals A and B may be readily ascertained by employing conventional EKG or other monitoring equipment.

If the power supply of the present invention admits of an application not requiring the surgical implantation thereof in an organism, it is appreciated that the operativeness of voltage sources 101–104 may, nevertheless, be examined in a manner similar to that just described. However, switch 125 may then comprise any conventional manually operable switch means well known to those of ordinary skill in the prior art.

In the foregoing description, the voltage drops across each of the diodes herein have not been taken into account. It should be noted, however, that the effects attributed to such voltage drops are negligible. Moreover, these negligible effects may be further minimized by selecting suitable diodes exhibiting desirably low forward biasing characteristics. Alternatively, the voltages produced by each of the voltage sources 101–104 may be relatively large in comparison to the forward voltage drop experienced by each diode, whereby the effects of such forward voltage drop are seen to be insignificant.

While the invention has been particularly shown and described with reference to a specific embodiment thereof, it will be obvious to those skilled in the art that various changes and modifications in form and details may be made without departing from the spirit and scope of the invention. It is therefore intended that the appended claims be interpreted as including all such changes and modifications.

What is claimed is:

1. A multiple redundant power supply for supplying a substantially constant voltage to output terminals notwithstanding a failure of one or more voltage sources included therein comprising:
    a first pair of voltage sources coupled to one output terminal;
    first switch means interconnecting the voltage sources included in said first pair and adapted when activated to provide a series connection between said voltage sources included in said first pair;
    a second pair of voltage sources coupled to another output terminal and connected in series with said first pair of voltage sources whereby a series connection is provided between either one of the voltage sources included in said first pair and either one of the voltage sources included in said second pair;
    second switch means interconnecting the voltage sources included in said second pair and adapted when activated to provide a series connection between said voltage sources included in said second pair; and
    voltage detecting means coupled to said output terminals for selectively detecting a failure of said first or second pairs of voltage sources and for activating said second or first switch means, respectively, said voltage detecting means including first transistor means adapted to assume a first state when neither said first pair nor said second pair of voltage sources has failed and a second state when said first pair or said second pair of voltage sources has failed; and control transistor means coupled to said first transistor means for controlling the state assumed by said first transistor means; said control transistor means being coupled to the series connection of said first and second pairs of voltage sources for receiving a bias voltage therefrom.

2. The multiple redundant power supply of claim 1 further including first and second uni-directional current conducting means connected in parallel relationship with said first and second pairs of voltage sources, respectively, for selectively providing a first conducting path between said one output terminal and said second pair of voltage sources when said first pair of voltage sources fails and a second conducting path between said other output terminal and said first pair of voltage sources when said second pair of voltage sources fails.

3. The multiple redundant power supply of claim 2 wherein said first and second switch means each comprise transistor means having collector and emitter electrodes coupled to the respective voltage sources included in the associated pair of voltage sources and a base electrode coupled to said first transistor means and responsive to the state assumed thereby.

4. The multiple redundant power supply of claim 3 further including operable switch means coupled to said control transistor means for de-energizing said control transistor means thereby forcing said first transistor means to assume said second state whereby a series connection is provided between said voltage sources included in said first pair and a series connection is provided between said voltage sources included in said second pair.

5. The multiple redundant power supply of claim 3 wherein said first transistor means and said control transistor means comprise complementary transistors each including a base electrode, said base electrode of said control transistor means being coupled to said series connection of said first and second pairs of voltage sources and said base electrode of said first transistor means being coupled to the collector electrode of said control transistor means.

6. A multiple redundant power supply for supplying a substantially constant voltage to output terminals notwithstanding a failure or one or more voltage sources included therein comprising:
    first and second voltage sources coupled in parallel relationship to one output terminal;
    third and fourth voltage sources coupled in parallel relationship to another output terminal and connected in series with said first and second parallel connected voltage sources whereby a series connection is provided between either one of said first and second voltage sources and either one of said third and fourth voltage sources;
    voltage detecting means coupled to said output terminals for selectively detecting a failure of both said first and second voltage sources or both said third and fourth voltage sources;
    first switch means interconnecting said first and second voltage sources and adapted when activated by said voltage detecting means upon the detection of a failure of both said third and fourth voltage sources to provide a series connection between said first and second voltage sources; and
    second switch means interconnecting said third and fourth voltage sources and adapted when activated by said voltage detecting means upon the detection of a failure of both said first and second voltage sources to provide a series connection between said third and fourth voltage sources.

7. The multiple redundant power supply of claim 6 including further switch means for simultaneously activating said first and second switch means to provide a series connection between said output terminals and said first, said second, said third and said fourth voltage sources, whereby the operativeness of said voltage sources may be examined.

8. The multiple redundant power supply of claim 7 wherein said further switch means comprises magnetically sensitive switch means.

* * * * *